Aug. 9, 1932.  R. J. STEPHENSON  1,870,659
ARTICLE HOLDER
Filed Aug. 7, 1930
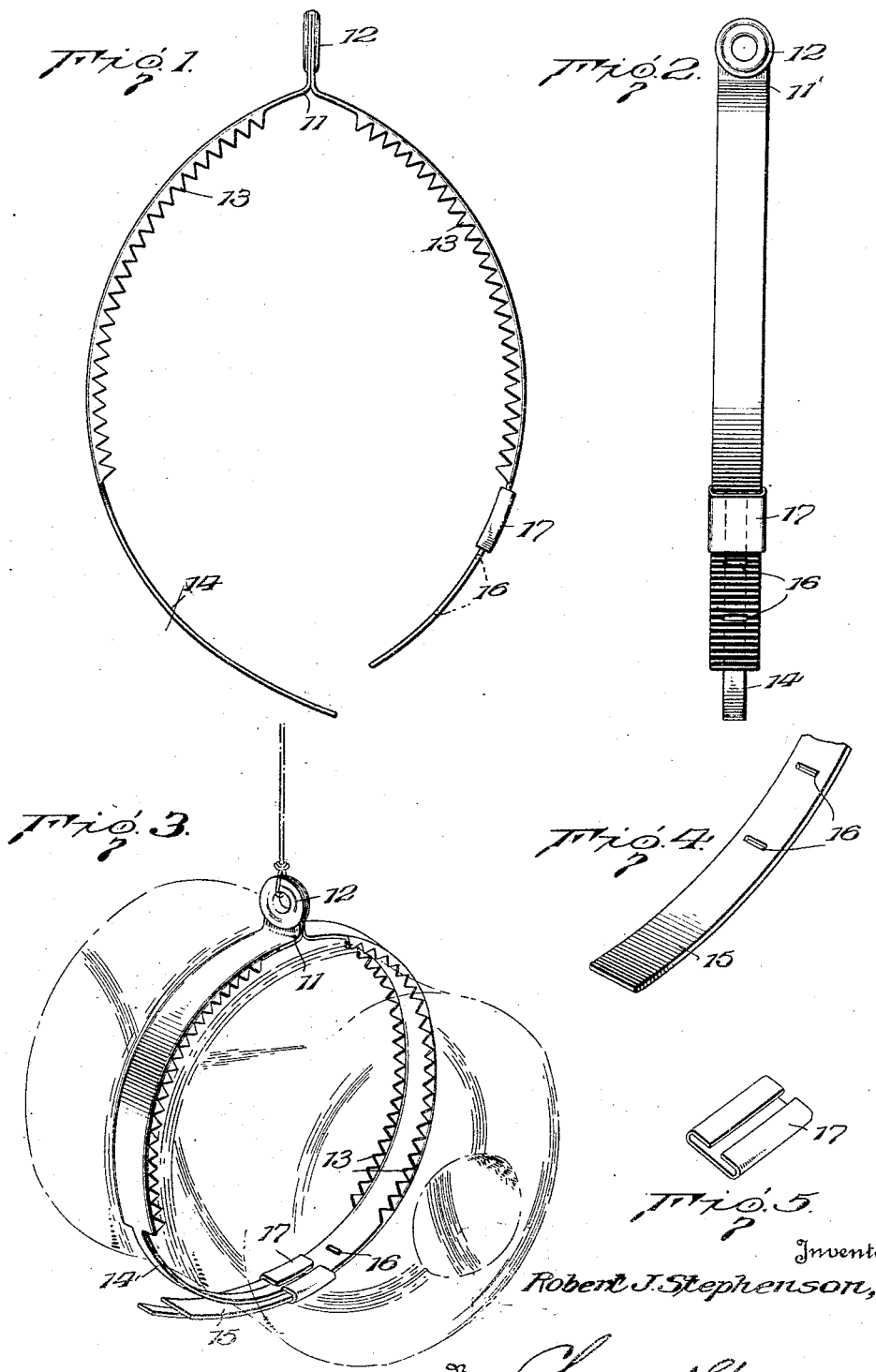
Inventor
Robert J. Stephenson,
By ⎯⎯⎯⎯⎯
His Attorneys Patented Aug. 9, 1932

1,870,659

UNITED STATES PATENT OFFICE

ROBERT J. STEPHENSON, OF AUBURN, NEW YORK, ASSIGNOR TO COLUMBIAN ROPE COMPANY, OF AUBURN, NEW YORK, A CORPORATION OF NEW YORK

ARTICLE HOLDER

Application filed August 7, 1930. Serial No. 473,686.

This invention relates to improvements in article holders and particularly to a holder for balls of twine and the like.

As is well known, balls of twine are so formed that the end of the twine from the inside of the ball should be used when twine is taken from the ball or otherwise the twine will frequently become badly tangled. It is also common practice, when putting twine up in ball form, to tie the ball into substantially permanent form by wrapping the outer end of the twine circumferentially around the ball. It is usually the inaccessibility of this last mentioned end that causes or leads a large number of persons to attempt to use the twine by unwrapping it from the exterior.

In view of these circumstances, or conditions, the present invention contemplates a holder for balls of twine that may be produced at such a low cost as to be used by the twine manufacturer in lieu of wrapping the outer end of the twine around the ball to hold the ball against unwrapping. This not only eliminates certain operations on the part of the manufacturer but it also prevents users of the twine unwrapping it from the outer end.

A further object is the provision of a holder that may carry advertising matter and which possesses the advantage of being adjustable whereby bands of one size only may be kept in stock although they are to be used on balls of different diameters.

The present holder, which is of band-like formation, is provided with means for attaching a suspension element thereto and it is also preferably provided with means whereby it may be readily placed around a ball of twine. In addition, the holder is provided with means for securely gripping the ball so that the latter may not be accidentally displaced.

With these and other objects in view the invention consists in certain details of construction and combinations and arrangements of parts all as will hereinafter be more fully described and the novel features thereof particularly pointed out in the appended claims.

In the accompanying drawing:

Figure 1 is an elevational view of the holder with the ends detached;

Fig. 2 is a side view;

Fig. 3 is a perspective view with the ends attached;

Fig. 4 is a detail view of one end of the holder; and

Fig. 5 is a perspective view of the clip for holding the detachably connected ends together.

In the preferred embodiment of the invention the holder is formed of a strap of metal having its intermediate portion bent upon itself and offset, as at 11, this offset portion being perforated and the folds of material held together by an eyelet 12, secured in said perforation. Along the major portion of its length the edges of the strap are serrated and turned inwardly, as indicated at 13. Beyond these serrated portions which extend from offset 11 toward the ends of the strap, the end portions of said strap are provided with means for detachably and adjustably connecting them together. For instance, one end 14 is of reduced width as compared to the other end 15, and this latter end has therein a plurality of transversely extending slots 16. These slots are spaced longitudinally of the strap and are of sufficient length to permit the reduced end 14 to be projected therethrough. When the holder is placed on a ball of twine this reduced end 14 is projected through one of the slots 16, and then bent back upon itself and upon the broad end 15 of the holder. To hold the two ends together there is slidably secured on the end 15 a clip 17 formed of a piece of metal having its ends bent back upon its intermediate portion, the end portions being adapted to overlie the narrow end 14 of the band at the inner side of said band and the intermediate portion being adapted to overlie the narrow end 14 on the outer side of the band. As will be apparent the holder, which is essentially a band adapted to encircle the ball of twine, may be made of various sizes to accommodate various sizes of twine balls by simply inserting the narrow end 14 through any one of the desired slots 16.

The holder may be produced at a very low cost so that it is entirely possible that the twine manufacturer can utilize it for retaining the windings of the ball of twine in place thereby eliminating the necessity of winding the twine itself around the ball to hold the ball intact during storage, shipment and use as is now commonly done. In any event, whether the holder is placed on the ball by the manufacturer, or whether the holders are distributed for use by consumers, the holder is well adapted for carrying advertising matter. Also, the provision of the eyelet permits the ball of twine to be suspended in a suitable place by the user and, as before mentioned, it has been found that the holder will retain the ball in shape until substantially the last one or two windings of the ball remain or, in other words, the holder will retain the twine until there is practically nothing but a skeleton of the original ball left.

What I claim is:

1. A holder for a ball of twine comprising a flexible strip having its ends detachably engaged with each other and formed into a band adapted to encircle the periphery of the ball, said band and attached ends lying flat against the ball, means for retaining the ball in said band and means on the exterior surface of the band for attachment of a suspension element.

2. A holder for a ball of twine comprising a flexible metallic strip formed into a band adapted to be applied to the periphery of the ball intermediate the ends of the latter, the side edges of said strip being serrated and turned radially inward to project into the mass of twine, and an eyelet projecting radially outwardly from said band.

3. A holder for a ball of twine comprising a flexible metallic strip formed into a band adapted to encircle the periphery of the ball intermediate the ends of the latter, means on said band penetrating said ball to prevent movement of the ball axially thereof, and means for attaching a suspension element to the band.

ROBT. J. STEPHENSON.